United States Patent [19]

Kadowaki et al.

[11] Patent Number: 4,532,273
[45] Date of Patent: Jul. 30, 1985

[54] TWO-PART ADHESIVE

[75] Inventors: Toshio Kadowaki, Amagasaki; Koichiro Sanji, Takatsuki, both of Japan

[73] Assignee: Sunstar Giken Kabushiki Kaisha, Osaka, Japan

[21] Appl. No.: 612,597

[22] Filed: May 21, 1984

[30] Foreign Application Priority Data

Oct. 7, 1983 [JP] Japan .................. 58-188601

[51] Int. Cl.$^3$ .............. C08L 93/00; C08L 91/06; C08F 267/10
[52] U.S. Cl. ................... 523/402; 523/400; 524/270; 524/271; 524/272; 524/273; 524/499; 524/501; 524/502; 524/508; 524/519; 526/312
[58] Field of Search ........... 526/312; 524/270, 271, 524/272, 273, 499, 501, 502, 508, 519; 523/400, 402

[56] References Cited

U.S. PATENT DOCUMENTS

| | | | |
|---|---|---|---|
| 3,862,068 | 1/1975 | Russell | 524/271 |
| 3,901,857 | 8/1975 | Sackman et al. | 526/312 |
| 4,138,446 | 2/1979 | Kawakami et al. | 526/312 |
| 4,200,562 | 4/1980 | Yoshioka et al. | 526/312 |
| 4,215,028 | 7/1980 | Mizuguchi et al. | 526/312 |
| 4,404,299 | 9/1983 | Decroix | 524/272 |
| 4,438,232 | 3/1984 | Lee | 524/273 |
| 4,478,993 | 10/1984 | Wideman et al. | 524/273 |

Primary Examiner—Herbert S. Cockeram
Attorney, Agent, or Firm—Birch, Stewart, Kolasch & Birch

[57] ABSTRACT

A two-part adhesive which comprises
(i) as the main ingredient an emulsion consisting essentially of (a) an aqueous emulsion of a polymer or copolymer obtained from an essential monomer of an adduct of a tertiary amino group-containing acrylic or methacrylic acid ester and an epihalohydrin, (b) a tackifier resin selected from the group consisting of a petroleum hydrocarbon resin, a phenolic resin, a terpene resin, a rosin resin, a coumarone resin, and a coumarone-indene resin, and (c) an epoxy compound containing two or more epoxy groups in the molecule; and
(ii) a curing agent selected from a primary or secondary amino group-containing compound. The adhesive is particularly useful for preparing automobile interior decorations, such as inside trims (e.g. doors, pillars), instrument panels, formed ceiling, and console box.

9 Claims, No Drawings

TWO-PART ADHESIVE

The present invention relates to a two-part adhesive. More particularly, it relates to a two-part adhesive comprising as a main ingredient an aqueous emulsion and a curing agent, which has excellent initial bond strength after laminating the substances to be adhered and excellent adhesion strength (creep resistance) at a high temperature.

Among various adhesives, organic solvent type adhesives are reluctantly from the viewpoint of hygienic and pollution problems, and instead chemical reaction curing type adhesives and emulsion type adhesives are frequently used. Particularly, emulsion type adhesives are excellent in safety and hygienic qualities and are advantageous for easy coating by spray etc. and easy application with a simple apparatus. However, the emulsion type adhesives are disadvantageous in delayed development of initial bond strength and further in having low adhesion strength at a high temperature.

The present inventors had already provided a two-part adhesive having rapid a crosslinking rate and high adhesion strength at a high temperature, which comprises as the main ingredient an aqueous emulsion of a polymer or copolymer obtained from an essential monomer: an adduct of a tertiary amino group-containing acrylic or methacrylic acid ester with an epihalohydrin and a curing agent: a polyethyleneimine (cf. Japanese Patent First Publication No. 52376/1983). However, as a result of subjecting such a two-part adhesive to experiments for practical use, it has been found that when the adhesive is applied to the preparation of interior decorations for automobiles comprising laminating a flexible sheet (e.g. a laminate of a synthetic resin foam and a surface layer) to a variety of a synthetic resin-made formed plate by pressing with a vacuum forming machine or a press forming machine, wherein the adhesion processing of interior decorations, such as inside trims (e.g. door, pillar), instrument panels, formed ceiling, console box, etc. is usually carried out by preheating the substances to be adhered before coating of the adhesive and/or by heating the laminated product to cure for the purpose of enhancing the processability and productivity, there is occasionally observed a blister at the curved area (such as a concave shape area) because a tension is given to the flexible sheet, and in the case of applying to a particularly complex shape area, it can not practically be used for lamination of the substances to be adhered.

Under the circumstance, the present inventors have further studied on an improvement of two-part adhesive for giving excellent initial bond strength and excellent adhesion strength at a high temperature, and then, have found that the desired two-part adhesive having excellent properties can be obtained by incorporating the above emulsion with a specific tackifier resin and an epoxy compound.

An object of the present invention is to provide an improved two-part adhesive having excellent initial bond strength and adhesion strength at a high temperature. Another object of the invention is to provide a two-part adhesive suitable for laminating a synthetic resin-made formed plate and a flexible sheet, particularly in automobile industries. These and other objects and advantages of the invention will be apparent to those skilled in the art from the following description.

The two-part adhesive of the present invention comprises (i) as the main ingredient an emulsion consisting essentially of (a) an aqueous emulsion of a polymer or copolymer obtained from an essential monomer of an adduct of a tertiary amino group-containing acrylic or methacrylic acid ester and an epihalohydrin, (b) a tackifier resin selected from the group consisting of a petroleum hydrocarbon resin, a phenolic resin, a terpene resin, a rosin resin, a coumarone resin, and a coumarone-indene resin, and (c) an epoxy compound containing two or more epoxy groups in the molecule; and (ii) a curing agent selected from primary or secondary amino group-containing compounds.

The adduct of a tertiary amino group-containing acrylic or methacrylic acid ester with an epihalohydrin used in the present invention as an essential monomer for preparing a polymer or copolymer in the emulsion component (a) includes monomers of the formula:

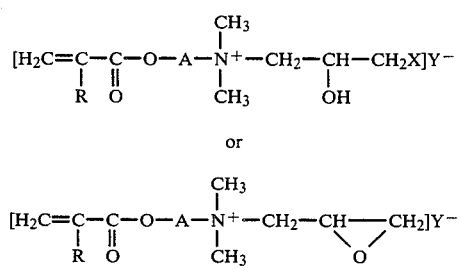

wherein R is hydrogen atom or methyl; A is an alkylene having 2 to 6 carbon atoms or a polyoxyethylene group of the formula: $(CH_2CH_2O)_nCH_2CH_2-$ (wherein n is an integer of 1 or more, preferably 1 to 11); X is iodine, bromine or chlorine; Y is a monovalent anion, such as a halogen ion (e.g. iodine, bromine or chlorine ion), or an anion of inorganic or organic acids (e.g. phosphate, acid phosphate, sulfate, bisulfate, methylsulfate, carboxylate, sulfonate, sulfamate, acetate, formate, oxalate or α-methacryloxyacetate). Said monomers can be prepared by a known method, for example, by a method as disclosed in Japanese Patent Second Publication No. 21087/1972.

One or more of the above monomers are polymerized or copolymerized, optionally together with a monomer having an ethylenical double bond as mentioned hereinafter, by a conventional method to give the polymer or copolymer used in the present invention.

The monomer having an ethylenical double bond includes $C_1$–$C_{18}$ fatty acid vinyl esters, such as vinyl acetate, vinyl laurate, and vinyl stearate; acrylic or methacylic acid esters with alcohols selected from $C_1$–$C_{18}$ alkanols (e.g. methanol, ethanol, propanol, butanol, 2-ethylhexyl alcohol, octyl alcohol, decyl alcohol, undecyl alcohol, octradecyl alcohol), benzyl alcohol, cyclohexyl alcohol, and isobornyl alcohol, such as methyl acrylate, methyl methacylate, ethyl acrylate, ethyl methacrylate, butyl acrylate, butyl methacrylate, 2-ethylhexyl acrylate, 2-ethylhexyl methacrylate, octadecyl acrylate, and octadecyl methacrylate; vinyl aromatic hydrocarbons, such as styrene, isopropenyltoluene, various dialkylstyrenes; nitriles such as acrylonitrile, methacrylonitrile, and phenylacrylonitrile; acrylic amides, such as acrylamide, methacrylamide, N-methylolacrylamide, N-monoalkyl(meth)acrylamides [e.g. N-monomethyl(meth)acrylamide, N-monoethyl(meth)acrylamide, N-monopropyl(meth)acrylamide, N-monobutyl(meth)acrylamide], and N-dialkyl(meth)acrylamides [e.g. N-dimethyl(meth)acrylamide, N-diethyl(meth)acrylamide, N-dipropyl(meth)acrylamide, N-dibutyl(meth)acrylamide]; aracrylamides [e.g. N-monophenyl(meth)acrylamide, N-diphenyl(meth)acrylamide]; vinyl ethers (e.g. butyl vinyl ether); N-vinyllactams (e.g. N-vinylpyrrolidone); olefins (e.g. ethylene), fluorovinyl compounds (e.g. vinylidene fluoride); hydroxy group- or amino group-containing monomer or β-hydroxyethyl acrylate or methacrylate as disclosed in U.S. Pat. No. 3,150,112; vinyl chloride and vinylidene chloride; alkyl vinyl ketones (e.g. methyl vinyl ketone, ethyl vinyl ketone, methyl isopropenyl ketone); itaconic acid diesters having one $CH_2=C<$ group, such as dimethyl itaconate, diethyl itaconate, dipropyl itaconate, dibutyl itaconate, itaconic acid esters with other saturated monovalent fatty alcohols, diphenyl itaconate, dibenzyl itaconate, di(phenylethyl) itaconate; allyl or methallyl esters of saturated aliphatic monocarboxylic acids, such as allyl acetate, methallyl acetate, allyl propionate, methallyl propionate, allyl valerate, methallyl valerate; vinylthiophene; 4-vinylpyridine; and vinylpyrrole.

The polymers or copolymers are used in the form of an aqueous emulsion, which may be prepared by emulsifying the previously prepared polymer or copolymer in water, or may directly be prepared by emulsion polymerization of the monomers. Preferred emulsion contains 40 to 60% by weight of resin component.

The tackifier resin used as the component (b) in the present invention includes the following groups I to VI, which may be used alone or in combination of two or more thereof.

I. Petroleum hydrocarbon resins: for example, a synthetic polyterpene resin (Quintone ®, manufactured by Nippon Zeon K.K.), aliphatic hydrocarbon resins (e.g. Piccopale resin, manufactured by Hercules Corp.), alicyclic hydrocarbon resins (e.g. Escorez ®8000, manufactured by Esso Chemical), aromatic hydrocarbon resins (e.g. Picco 6000 resins ®, manufactured by Hercules Corp.), unsaturated hydrocarbon resins (e.g. Escorez ®1102, manufactured by Esso Chemical), isoprenic resins (e.g. Petrozine ®, Hirez ®, manufactured by Mitsui Petrochemical Ind. Ltd., Escorez ®1300, manufactured by Esso Chemical)

II. Phenol resins, such as p-t-butylphenol/acetylene resin, phenol/formaldehyde resin (e.g. Tamanol ®, manufactured by Arakawa kagaku K.K.), terpene/phenol resin (e.g. YS Polyster ®, manufctured by Yasuhara Yushi Kogyo K.K.)

III. Terpene resins

IV. Rosin derivatives, such as rosin pentaerythritol ester, rosin glycerol ester (e.g. Hariester ®, manufactured by Harima Kasei K.K.), hydrogenated rosin V. Coumarone resins VI. Coumarone-indene resins Among the above resins, petroleum hydrocarbon resins and rosin derivatives are particularly preferable.

The tackifier resins are usually incorporated in an amount of 5 to 200 parts by weight, preferably 10 to 100 parts by weight, per 100 parts by weight of the emulsion (a) (as a solid). When the amount of the tackifier resin is less than 5 parts by weight, the desired adhesion strength can not sufficiently be exhibited, and on the other hand, when the amount is over 200 parts by weight, the bonding strength is lowered and hence the desired initial bond strength is hardly exhibited.

The epoxy compound used as the component (c) of the emulsion includes (1) a polyglycidyl ether of a polyvalent phenol or an alkylene oxide adduct of the polyvalent phenol, such as bisphenol A diglycidyl ether, bisphenol A ethylene oxide and/or propylene oxide adduct; (2) a polyglycidyl ether of a hydrogenated product of a polyvalent phenol or an alkylene oxide adduct of the polyvalent phenol, such as hydrogenated bisphenol A polyglycidyl ether; (3) a polyglycidyl ether of an aliphatic polyalcohol, such as glycerin triglycidyl ether, 1,6-hexanediol diglycidyl ether, diglycidyl ether of castor oil; (4) a diglycidyl ether of a silicon-containing dialcohol, such as a compound of the formula:

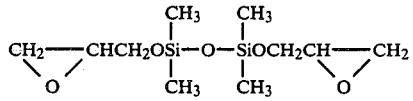

(5) a polyglycidyl compound of an amine or an amide, such as a compound for the formula:

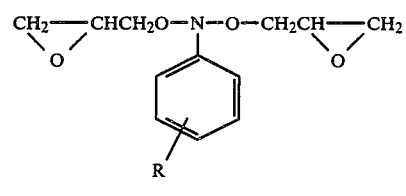

(R is hydrogen or methyl)

or

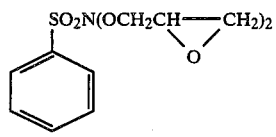

(6) an epoxy resin-modified polybutadiene resin as mentioned hereinbelow; and (7) a diglycidyl ester of a dicarboxylic acid, such as a compound of the formula:

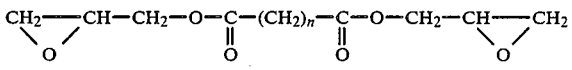

wherein n an integer of 1 to 8, i.e. succinic acid diglycidyl ester (n=2 in the above formula), adipic acid diglycidyl ester (n=4 in the above formula), phthalic acid diglycidyl ester, isophthalic acid diglycidyl ester, tetrahydrophthalic acid diglycidyl ester.

The epoxy resin-modified polybutadiene resin as mentioned above contains two or more terminal epoxy groups and is prepared by reacting a terminal carboxyl group-containing polybutadiene homopolymer and/or copolymer (hereinafter, referred to as "polybutadiene polymer") with an epoxy resin. The reaction is usually carried out by mixing with agitation both compounds in a ratio of 2.0 to 20 equivalents of the epoxy group to 1 equivalent of the carboxyl group in the presence of a catalyst (e.g. 2-ethylimidazole, tetraethyl ammonium bromide, benzyldimethylamine, triethylenediamine, diethylamine and butylamine, which may be used alone or in combination of two or more thereof) in an amount of 0.01 to 5 molar % to the epoxy group at a temperature of 130° to 190° C. for 2 to 5 hours. One of the reactant, polybutadiene polymer is commercially available and includes, for example, "Nisso PB-G-1000", "Nisso PB-G-2000", "Nisso PB-G-3000" (manufactured by Nippon Soda K.K.), "Poly-BD" (manufactured by Arco K.K.), and further a maleic adduct of a polybutadiene homopolymer or copolymer containing no terminal carboxyl group. Other reactant, epoxy resin is also commercially available and includes, for example, bisphenol A epoxy resins [e.g. "Epicoat #827", "Epicoat #828", "Epicoat #834", "Epicoat #836", "Epicoat #1001", "Epicoat #1004", "Epicoat #1007" (manufactured by Shell Chemicals); "Aralduct CY252", "Aralduct CY250", "Aralduct CY260", "Aralduct CY280", "Aralduct CY6071", "Aralduct CY6084" (manufactured by Ciba-Geigy)], novolac type epxoy resins; bisphenol A side chain type diglycidyl ether resins [e.g. "Adecaresin EP4000" (manufactured by Asahi Denka Kogyo K.K.)]; urethane-modified epoxy resins; alicyclic epxoy resins; resolcine diglycidyl ether epoxy resins; glycidyl ester type epoxy resins; p-hydroxybenzoic acid diglycidyl ether epoxy resins; brominated bisphenol A type epoxy resins; glycidylamine epoxy resins; or the like.

Suitable examples of the epoxy resin-modified polybutadiene resins are compounds obtained by reacting 1,2-polybutadiene and a bisphenol A diglycidyl ether type epxoy resin which have the following formula:

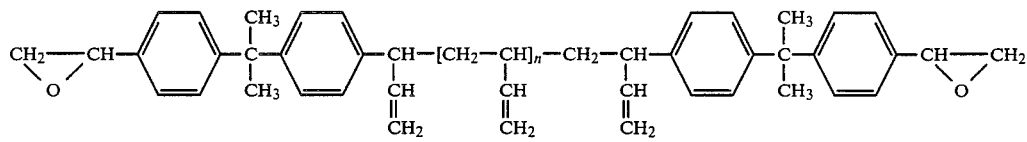

or

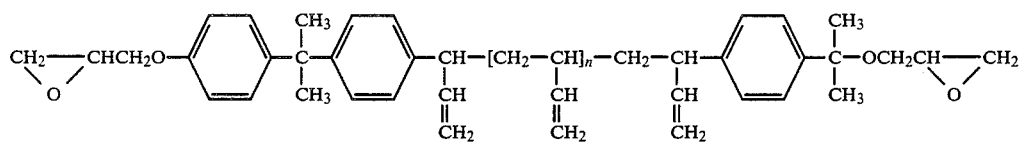

wherein n is an integer of 20 to 26.

The above epoxy compounds can be used alone or in combination of two or more thereof. Particularly preferred epoxy compounds are a hydrogenated bisphenol A diglycidyl ether, an aliphatic polyalcohol diglycidyl ether, and an epoxy resin-modified polybutadiene resin.

The epoxy compound is incorporated in an amount of 0.5 to 100 parts by weight, preferably 1 to 50 parts by weight, to 100 parts by weight of the component (a): aqueous emulsion (in solid). When the amount of the epoxy compound is less than 0.5 part by weight, the desired initial bond strength is hardly obtainable, and on the other hand, when the amount is over 100 parts by weight, the adhesive showes lowered coagulation properties and hence tends to have less heat resistance.

The main ingredient emulsion (i) can be prepared by incorporating the above components (a), (b) and (c). The tackifier resin (b) and the epoxy compound (c) may be incorporated as they stand or in the form of a solution in an appropriate organic solvent or more preferably in the form of an aqueous emulsion. The aqueous emulsion can be prepared in the following manner. The component (b) or (c) is dissolved in a water-insoluble organic solvent (e.g. toluene, xylene, benzene, cyclohexane, carbon tetrachloride, etc.) in a comparatively high concentration to give an organic solvent solution. Separately, an aqueous solution of an appropriate emulsifier is prepared. The emulsifier includes, for example, primary to tertiary alkylamine salts (e.g. laurylamine hydrochloride, dilaurylamine hydrochloride, lauryldimethylamine hydrochloride, etc.), alkanolamine salts (e.g. ethanolamine hydrochloride, etc.), polyethylenepolyamine salts (e.g. ethylenediamine hydrochloride, diethylenetriamine hydrochloride, etc.), quaternary ammonium salts (e.g. alkyltrimethyl ammonium hydrochloride, etc.), cationic surfactants (e.g. salts of morpholine, guanidine, hydrazine, N,N-diethylethylenediamine, aminoethylethanolamine, etc.), carboxylate type nonionic surfactants (e.g. methyl laurylaminopropionate hydrochloride, lauryldimethylbetaine, etc.), nonionic surfactants (e.g. sulfate type, sulfonate type, phosphate type, etc.), which may be used alone or in combination of two or more thereof. The aqueous solution may also be incorporated with a protective colloid (e.g. partially saponified polyvinyl alcohol, casein, glue, etc.). The aqueous solution (which has usually a concentration of an emulsifier of 0.1 to 5% by weight) is added dropwise with high agitation to the above organic solvent solution to emulsify with phase inversion (by so-called solution emulsifying method), optionally followed by removal of the organic solvent. Alternatively, the emulsion of tackifier resin is prepared by melting the tackifier resin by heating abcve its melting point and adding thereto dropwise the above aqueous solution of emulsifier to emulsify (by so-called hot-melt emulsifying method). The aqueous emulsion has a solid component of 30 to 50% by weight.

The main ingredient, emulsion may optionally be incorporated with other conventional additives, for example, nonionic thickening agents (e.g. starch, guar gum, locust bean gum, gelatine, polyacrylamide, polyethylene oxide, hydroxyethylcellulose, hydroxypropylcellulose, etc.), cationic thickening agents (e.g. water-soluble aniline resin hydrochloride, polydiallyldimethyl ammonium chloride, etc.), fillers (e.g. calcium carbonate, silicic acid, silicate, clay, talc, asbestos, etc.), plasticizers (e.g. higher alcohols, glycols, phthalates, etc.), colorants such as titanium white and other dystuffs and pigments, organic solvents, preservatives, antioxidants, anticorrosives, viscosity stabilizers, defoaming agents, perfume, or the like.

The primary or secondary amino group-containing compound used as the curing agent (ii) includes, for example, polyethyleneimine or its adduct, polyamidepolyamine, and amino resins, among which polyethyleneimine is particularly preferable. Other conventional curing agents, such as polysulfide resins, polycondensates of a phenol (e.g. phenol, alkylphenols) with formalin, may also optionally be used. The preferred curing agent has a molecular weight of 250 to 10,000 in view of good reactivity, workability and suitable viscosity. The curing agent is usually used in the form of an aqueous solution having a concentration of 0.1% by weight or higher, but may be used as it stands without being diluted with water. The curing agent in the form of an aqueous solution may also contain other additives, such as thickening agents, colorants and organic solvents as mentioned above and further a catalyst such as metal hydroxides and sodium sesquicarbonate.

When the two-part adhesive of the present invention is used, the main ingredient, emulsion (i) is mixed with the curing agent, a primary or secondary amino group-containing compound or its aqueous solution (ii). They can also be mixed simultaneously by spraying with a two-head gun when applied to the substances to be adhered. From the view point of the workability, the primary or secondary amino group-containing compound is preferably mixed in an amount of 50 to 0.1 part by weight to 100 parts by weight of the main ingredient, emulsion (i).

The two-part adhesive of the present invention is mainly used in the production of automobile interior decorations, such as inside trims (e.g. doors, pillars), instrument panels, formed ceiling, console box, or the like. For instance, the automobile interior decorations are prepared by firstly preparing the formed core product having various complexed shapes by press molding or injection molding and adhering a skin material (a flexible sheet) using the two-part adhesive of the present invention, followed by pressing with a vacuum forming machine or a press forming machine. The starting plate for preparing the formed core product is usually made from synthetic resins, for example, ABS, polypropylene, polyethylene, hard board impregnated with a resin. The flexible sheet is a foam product of synthetic resins such as polyethylene, polypropylene, polyurethane, soft polyvinyl chloride, etc.; a laminate of a skin layer of the above synthetic resin foam and a synthetic leather or sheet of polyvinyl chloride, polyurethane, etc.; non-woven fabrics or resin-impregnated felts of natural or synthetic fibers; and the like.

When the substances to be adhered are adhered with the two-part adhesive of the present invention, the adhesive is applied to the area to be adhered of the substances and then dried and cured by heating. The heating is preferably done at a temperature of not higher than 140° C., more preferably not higher than 100° C., in order to avoid excess curing which results in loss of adhesion activity. The flexible sheet is preferably preheated before applying thereto the adhesive. After joining the flexible sheet and the formed plate by applying an adhesive, the joined substances are pressed with a vacuum forming machine or a press machine for about 10 to 180 seconds, followed by subjecting to crosslinking treatment by heating at a temperature of 90° C. or higher for a few to several minutes.

The present invention is illustrated by the following Preparations and Examples, but should not be construed to be limited thereto.

PREPARATIONS 1 TO 21

(Preparation of an Aqueous Emulsion)

The tackifier resins (petroleum hydrocarbon resins and rosin derivatives) and the epoxy compounds (epoxy resin-modified polybutadiene resins, aliphatic polyalcohol diglycidyl ethers and hydrogenated bisphenol A diglycidyl ethers) as shown in Table 1 are dissolved in toluene in an amount (part by weight) as shown in Table 1 to 70 parts by weight of toluene. To the resin solution in toluene is added dropwise an aqueous solution of an emulsifier (part by weight) as shown in Table 1 with high agitation to give aqueous emulsions. The concentration (part by weight) of the components and the viscosity are shown in Table 1. Among the above preparations, Preparation No. 21 is for the purpose of reference.

TABLE 1

| Ingredients | 1 | 2 | 3 | 4 | 5 | 6 | 7 | 8 | 9 | 10 |
|---|---|---|---|---|---|---|---|---|---|---|
| Petroleum hydrocarbon resins*1 | | | | | | | | | | |
| Escolez 1102 | 70 | 70 | 70 | 60 | 60 | | | 70 | 70 | 70 |
| Zeon D-100 | | | | | | 70 | | | | |
| Hiresin 90 | | | | | | | 70 | | | |
| Rosin deriv.*2 | | | | 10 | 10 | | | | | |
| Ester Gum H | | | | | | | | | | |
| Epoxy resin-modified polybutadiene resin*3 | | | | | | | | | | |
| EPB-13 | 30 | | | 30 | 30 | 30 | 30 | | | |
| EPB-17 | | 30 | | | | | | | | |
| EPB-23 | | | 30 | | | | | | | |
| Polybd R45EPT | | | | | | | | 30 | | |
| Polybd R45EPI | | | | | | | | | 30 | |
| BF-1000 | | | | | | | | | | 30 |
| Emulsifier | | | | | | | | | | |
| Polyvinyl alcohol | 1 | 1 | 1 | 1 | 1 | 1 | 1 | 1 | 1 | 1 |
| Nonipol 95*6 | 1 | 1 | 1 | 1 | | 1 | 1 | 1 | 1 | 1 |
| Cation SA*7 | | | | | 1 | | | | | |
| Deionized water | 98 | 98 | 98 | 98 | 98 | 98 | 98 | 98 | 98 | 98 |
| Viscosity (cps/20° C.) | 50 | 50 | 60 | 60 | 55 | 55 | 60 | 70 | 65 | 90 |

| Ingredients | 11 | 12 | 13 | 14 | 15 | 16 | 17 | 18 | 19 | 20 | 21 |
|---|---|---|---|---|---|---|---|---|---|---|---|
| Petroleum hydrocarbon resins*1 | | | | | | | | | | | |
| Escolez 1102 | 70 | 70 | 70 | 70 | 70 | 70 | 70 | 70 | 70 | 70 | 100 |
| Epoxy resin-modified polybutadiene resin*3 | | | | | | | | | | | |
| EPB-13 | | | | | | | | | 15 | 15 | |
| Aliphatic polyalcohol diglycidyl ether*4 | | | | | | | | | | | |
| DER-732 | 30 | | | | | | | | | | |
| DER-736 | | 30 | | | | | | | | | |
| ED-506 | | | 30 | | | | | 15 | | | |
| Epolyca R-63 | | | | 30 | | | | | | | |
| Epolyca R-105 | | | | | 30 | | | | | | |
| Epolyca D-520 | | | | | | 30 | | | | | |
| Hydrogenated bisphenol A diglycidyl ether*5 | | | | | | | | | | | |
| Epichlone 750 | | | | | | | 30 | | | 15 | |
| EP-4080 | | | | | | | | 30 | | | |
| Emulsifier | | | | | | | | | | | |
| Polyvinyl alcohol | 1 | 1 | 1 | 1 | 1 | 1 | 1 | 1 | 1 | 1 | 1 |
| Nonipol 95*6 | 1 | 1 | 1 | 1 | 1 | 1 | 1 | 1 | 1 | 1 | 1 |
| Deionized water | 98 | 98 | 98 | 98 | 98 | 98 | 98 | 98 | 98 | 98 | 98 |
| Viscosity | 80 | 100 | 80 | 90 | 80 | 80 | 80 | 70 | 80 | 90 | 60 |

TABLE 1-continued (cps/20° C.)

[Note]:
*[1]"Escolez 1102", manufactured by Esso Chemical; "Zeon D-100", manufactured by Nippon Zeon; "Hiresin 90", manufactured by Toho Chemical
*[2]"Ester Gum H", manufactured by Arakawa Chemical
*[3]"EPB-13", "EPB-17" and "EPB-23", manufactured by Nippon Soda; "Polybd R45EPT" and "Polybd R45EPI", manufactured by Idemitsu Chemical; "BF-1000", manufactured by Adeca Argus Chemical
*[4]"DER-732" and "DER-736", manufactured by Dow Chemical; "DE-506", manufactured by Asahi Chemical; "Epolica R-63", "Epolica R-105" and Epolical D-520", manufactured by Shikishima Boseki K. K.
*[5]"Epichlone 750", manufactured by Dainippon Ink Chemical; "EP-4080", manufactured by Asahi Chemical
*[6]"Nonipol 90", a polyoxyethylene nonylphenyl ether (ethylene oxide addition molar number: 9.5) manufactured by Sanyo Kasei Kogyo
*[7]"Cation SA", octadecylamine acetate, manufactured by Nippon Yushi

PREPARATIONS 22 TO 31

(Preparation of Aqueous Solution of Curing Agent)

The curing agent as shown in Table 2 is dissolved with stirring in deionized water in the amount (part by weight) as shown in Table 2 to prepare an aqueous solution of a curing agent.

TABLE 2

| Ingredients | 22 | 23 | 24 | 25 | 26 | 27 | 28 | 29 | 30 | 31 |
|---|---|---|---|---|---|---|---|---|---|---|
| Polyethyleneimine*[1] | | | | | | | | | | |
| Epomine SP-103 | 20 | | | | | | | | | |
| Epomine SP-003 | | 20 | | | | | | | | |
| Epomine SP-006 | | | 20 | | | | | | | |
| Epomine SP-018 | | | | 20 | | | | | | |
| Epomine SP-200 | | | | | 20 | | | | | |
| Polyamide resin*[2] | | | | | | | | | | |
| Polymide L-45-3 | | | | | | 20 | | | | |
| Polyamide-polyamine*[3] | | | | | | | | | | |
| Adecahardner X-6225 | | | | | | | 50 | | | |
| Adecahardner X-6303 | | | | | | | | 50 | | |
| Imidazole compound | | | | | | | | | | |
| Polytrone HR-1000 | | | | | | | | | 50 | |
| Polytrone HR-1100 | | | | | | | | | | 50 |
| Deionized water | 80 | 80 | 80 | 80 | 80 | 80 | 50 | 50 | 50 | 50 |

[Note]:
*[1]"Epomine SP-103" (molecular weight: 250), "Epomine SP-003" (molecular weight: about 300), "Epomine SP-006" (molecular weight: about 600), "Epomine SP-018" (molecular weight: about 1800), and "Epomine SP-200" (molecular weight: about 10000), manufactured by Nippon Shokubai Kagaku Kogyo
*[2]"Polymide L-45-3", manufactured by Sanyo Chemical
*[3]"Adecahardner X-6225" and "Adecahardner X-6303", manufactured by Asahi Denca Kogyo
*[4]"Polytrone HR-1000" and "Polytrone HR-1100", manufactured by Asahi Chemical

EXAMPLES 1 TO 29

An emulsion of a tertiary amino group-containing acrylic ester polymer (Primal E-1126, manufactured by Rohm and Haas, solid content: 60% by weight) (100 parts by weight), the aqueous emulsion prepared in the above Preparations 1 to 20 (50 parts by weight) and the aqueous solution of a curing agent prepared in the above Preparations 22 to 31 (10 parts by weight) are mixed as shown in Table 3 to obtain two-part adhesives.

The adhesive thus obtained (2.4 g) was applied to one side of an ABS resin plate (100×200×2 mm) by spraying and dried at 80° C. for 2 hours. Separately, the surface to be adhered of a polyethylene foam (Toraypef®, manufactured by Toray Co., 250×200×4 mm) was heat-treated at 140° C. for 5 minutes, and this foam is laminated on the above ABS resin plate, and the laminated substances were pressed with a load of 200 g/cm² for 10 seconds. The resulting laminated substances were set horizontally in an atmosphere of 80° C. wherein the polyethylene foam was made underside and a load of 200 g hanged at one end of the foam. Even after one hour, no sag of the foam was observed. Besides, the laminated substances were subjected to a test for adhesion (peel strength). As a result, it showed a strength of 3.5 kg/in, wherein the polyethylene foam was broken. The results are also shown in Table 3.

REFERENCE EXMAPLE 1

In the same manner as described in Examples 1 to 29 except that the aqueous emulsion (50 parts by weight) as obtained in Preparation 21 is used, a two-part adhesive is prepared.

By using the adhesive, the adhering the substances was done likewise, but the polyethylene foam was fallen down with loading at 80° C. only after 30 minutes. Besides, according to the adhesion test, it showed a strength of 1.5 kg/in, wherein the polyethylene foam was peeled at the interface. The results are also shown in Table 3.

TABLE 3

| | 1 | 2 | 3 | 4 | 5 | 6 | 7 | 8 | 9 | 10 | 11 | 12 |
|---|---|---|---|---|---|---|---|---|---|---|---|---|
| Primal E-1126 Aqueous emulsion | 100 | 100 | 100 | 100 | 100 | 100 | 100 | 100 | 100 | 100 | 100 | 100 |
| Prep. 1 | 50 | | | | | | | | | | | |
| Prep. 2 | | 50 | | | | | | | | | | |
| Prep. 3 | | | 50 | | | | | | | | | |
| Prep. 4 | | | | 50 | | | | | | | | |
| Prep. 5 | | | | | 50 | | | | | | | |
| Prep. 6 | | | | | | 50 | | | | | | |
| Prep. 7 | | | | | | | 50 | | | | | |
| Prep. 8 | | | | | | | | 50 | | | | |
| Prep. 9 | | | | | | | | | 50 | | | |
| Prep. 10 | | | | | | | | | | 50 | | |

TABLE 3-continued

|  | | | | | | | | | | | | |
|---|---|---|---|---|---|---|---|---|---|---|---|---|
| Prep. 11 | | | | | | | | | | | 50 | |
| Prep. 12 | | | | | | | | | | | | 50 |
| Curing agent | | | | | | | | | | | | |
| Prep. 22 | 10 | 10 | 10 | 10 | 10 | 10 | 10 | 10 | 10 | 10 | 10 | 10 |
| Test result | | | | | | | | | | | | |
| Heat resistance (mm)*1 | 0 | 0 | 0 | 0 | 0 | 0 | 0 | 0 | 0 | 0 | 0 | 0 |
| Peel strength (kg/in)*2 | 3.5 | 3.5 | 3.5 | 3.5 | 3.5 | 3.5 | 3.5 | 3.5 | 3.5 | 3.5 | 3.5 | 3.5 |
| State of break | All were material break | | | | | | | | | | | |

| | Example No. | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Primal E-1126 Aqueous emulsion | 100 | 100 | 100 | 100 | 100 | 100 | 100 | 100 | 100 | 100 | 100 | 100 |
| Prep. 1 | | | | | | | | | 50 | 50 | 50 | 50 |
| Prep. 13 | 50 | | | | | | | | | | | |
| Prep. 14 | | 50 | | | | | | | | | | |
| Prep. 15 | | | 50 | | | | | | | | | |
| Prep. 16 | | | | 50 | | | | | | | | |
| Prep. 17 | | | | | 50 | | | | | | | |
| Prep. 18 | | | | | | 50 | | | | | | |
| Prep. 19 | | | | | | | 50 | | | | | |
| Prep. 20 | | | | | | | | 50 | | | | |
| Curing agent | | | | | | | | | | | | |
| Prep. 22 | 10 | 10 | 10 | 10 | 10 | 10 | 10 | 10 | | | | |
| Prep. 23 | | | | | | | | | 10 | | | |
| Prep. 24 | | | | | | | | | | 10 | | |
| Prep. 25 | | | | | | | | | | | 10 | |
| Prep. 26 | | | | | | | | | | | | 10 |
| Test result | | | | | | | | | | | | |
| Heat resistance (mm)*1 | 0 | 0 | 0 | 0 | 0 | 0 | 0 | 0 | 0 | 0 | 0 | 0 |
| Peel strength (kg/in)*2 | 3.5 | 3.5 | 3.5 | 3.5 | 3.5 | 3.5 | 3.5 | 3.5 | 3.5 | 3.5 | 3.5 | 3.5 |
| State of break | All were material break | | | | | | | | | | | |

| | Example No. | | | | | Reference Example |
|---|---|---|---|---|---|---|
| | 25 | 26 | 27 | 28 | 29 | |
| Primal E-1126 Aqueous emulsion | 100 | 100 | 100 | 100 | 100 | 100 |
| Prep. 1 | 50 | 50 | 50 | 50 | 50 | |
| Prep. 21 | | | | | | 50 |
| Curing agent | | | | | | |
| Prep. 27 | 10 | | | | | |
| Prep. 28 | | 10 | | | | |
| Prep. 29 | | | 10 | | | |
| Prep. 30 | | | | 10 | | |
| Prep. 31 | | | | | 10 | |
| Test result | | | | | | |
| Heat resistance (mm)*1 | 0 | 0 | 0 | 0 | 0 | Fallen in 30 min. |
| Peel strength (kg/in)*2 | 3.5 | 3.5 | 3.5 | 3.5 | 3.5 | 1.5 |
| State of break | All were material break | | | | | Broken at interface |

[Note]:
*1 The adhered substances (adhered area: 25 mm × 70 mm) were charged with a load of 200 g at one end at an angle of 90° and kept them at 80° C. for one hour, and then the length of peeled area was measured.
*2 A test piece of the adhered substances (width: 25 mm) was subjected to a peel test under the conditions of atmosphere of 20° C. and 65% relative humidity, at an angle of 180° at a crosshead speed of 200 mm with Autograph IM-500.

As is clear from the above test results, when compared Examples and Reference Example, the adhesives of the present invention showed far greater initial bond strength and heat resistance than those of the conventional emulsion type two-part adhesive. Besides, the two-part adhesive of the present invention is suitable for press adhesion of sheet materials sucn as a soft plastic foam.

What is claimed is:

1. A two-part adhesive which comprises
(i) as the main ingredient an emulsion consisting essentially of (a) an aqueous emulsion of a polymer or copolymer obtained from an essential monomer of an adduct of a tertiary amino group-containing acrylic or methacrylic acid ester and an epihalohydrin, (b) a tackifier resin selected from the group consisting of a petroleum hydrocarbon resin, a phenolic resin, a terpene resin, a rosin resin, a coumarone resin, and a coumarone-indene resin, and (c) an epoxy compound containing two or more epoxy groups in the molecule; and
(ii) a curing agent selected from a primary or secondary amino group-containing compound.

2. The two-part adhesive according to claim 1, wherein the components (b) and (c) are both in the form of an aqueous emulsion.

3. The two-part adhesive according to claim 1, wherein the curing agent (ii) is in the form of an aqueous solution.

4. The two-part adhesive according to claim 1, wherein the components (b) and (c) are incorporated in an amount of 5 to 200 parts by weight and 5 to 100 parts by weight, respectivley, to 100 parts by weight of the component (a).

5. The two-part adhesive according to claim 1, wherein the curing agent (ii) is incorporated in an amount of 0.02 to 20 parts by weight to 100 parts by weight of the aqueous emulsion (i).

6. The two-part adhesive according to claim 1, wherein the component (b) is a member selected from the group consisting of a petroleum hydrocarbon resin and a rosin resin.

7. The two-part adhesive according to claim 1, wherein the component (c) is a member selected from the group consisting of a hydrogenated bisphenol A diglycidyl ether, an aliphatic polyalcohol diglycidyl ether, and an epoxy resin-modified polybutadiene resin.

8. A two-part adhesive according to claim 1, wherein the component (b) is rosin resin and the component (c) is epoxy resin-modified polybutadiene resin.

9. A two-part adhesive according to claim 1, wherein the component (b) comprises a combination of petroleum hydrocarbon resin and rosin resin and said component (c) comprises a combination of hydrogenated bisphenol A diglycidyl ether and epoxy resin-modified polybutadiene resin.

* * * * *